US010562036B2

(12) United States Patent
Lansell et al.

(10) Patent No.: US 10,562,036 B2
(45) Date of Patent: *Feb. 18, 2020

(54) PROVIDING WEAR RESISTANCE IN A REACTOR CONFIGURED TO FACILITATE CHEMICAL REACTIONS AND/OR COMMINUTION OF SOLID FEED MATERIALS USING SHOCKWAVES CREATED IN A SUPERSONIC GASEOUS VORTEX

(71) Applicant: LLT International (Ireland) Ltd., New York, NY (US)

(72) Inventors: Peter Lansell, Kew (AU); William Keating, Fairfield (AU); David Lowe, Alphington (AU)

(73) Assignee: LLT International (Irelant) Ltd., Dublin (IE)

( * ) Notice: Subject to any disclaimer, the term of this patent is extended or adjusted under 35 U.S.C. 154(b) by 484 days.

This patent is subject to a terminal disclaimer.

(21) Appl. No.: 15/277,975

(22) Filed: Sep. 27, 2016

(65) Prior Publication Data

US 2019/0070576 A1    Mar. 7, 2019

Related U.S. Application Data

(63) Continuation of application No. 14/690,111, filed on Apr. 17, 2015, now Pat. No. 9,452,434.

(51) Int. Cl.
*B02C 19/00* (2006.01)
*B02C 19/06* (2006.01)
*B01J 19/10* (2006.01)

(52) U.S. Cl.
CPC .............. *B02C 19/06* (2013.01); *B01J 19/10* (2013.01); *B02C 19/061* (2013.01);
(Continued)

(58) Field of Classification Search
CPC ..... B02C 19/06; B02C 19/061; B02C 19/063; B02C 19/065; B02C 19/066; B01J 19/10
(Continued)

(56) References Cited

U.S. PATENT DOCUMENTS 2,257,907 A   10/1941  Griswold
2,532,554 A   12/1950  Joeck
(Continued)

FOREIGN PATENT DOCUMENTS

CN   102847596 A   1/2013
CN   103249667 A   8/2013
(Continued)

OTHER PUBLICATIONS

Final Office Action dated Jan. 27, 2017 in corresponding U.S. Appl. No. 14/690,149 (14 pages).
(Continued)

*Primary Examiner* — Faye Francis
(74) *Attorney, Agent, or Firm* — Pillsbury Winthrop Shaw Pittman, LLP

(57) ABSTRACT

Various wear resistance designs may be applied to a reactor configured to facilitate chemical reactions, and/or comminution using shockwaves created in a supersonic gaseous vortex. The reactor may include a rigid chamber having a substantially circular cross-section. A first gas inlet may be configured to introduce a high-velocity gas stream into the chamber. A first replaceable wear part may be disposed in the chamber to absorb wear impact caused by the gas stream. In some implementations, the first replaceable wear part may be a cylindrical rod continuously fed into the chamber. In some implementations, the first replaceable wear part may be coated with, or composed of, a catalytic material, and/or may be electrically isolated from the rest of the reactor. In some implementations, a second gas inlet may be disposed
(Continued)

to steer the gas stream to a desired area within the chamber to even out the wear impact.

17 Claims, 5 Drawing Sheets

(52) U.S. Cl.
CPC .......... *B02C 19/063* (2013.01); *B02C 19/065* (2013.01); *B02C 19/066* (2013.01); *B01J 2219/0869* (2013.01); *B01J 2219/0892* (2013.01); *B02C 2210/02* (2013.01)

(58) Field of Classification Search
USPC .......................................................... 241/40
See application file for complete search history.

(56) References Cited

U.S. PATENT DOCUMENTS

| | | | |
|---|---|---|---|
| 3,178,121 A | 4/1965 | Wallace, Jr. | |
| 3,254,848 A | 6/1966 | Stephanoff | |
| 3,257,080 A | 6/1966 | Snyder | |
| 3,301,292 A | 1/1967 | O'Connor | |
| 2,997,245 A | 8/1967 | Nilsson et al. | |
| 3,462,086 A | 8/1969 | Bertrand et al. | |
| 3,565,348 A | 2/1971 | Dickerson et al. | |
| 3,602,439 A | 8/1971 | Nakayama | |
| 3,620,946 A | 11/1971 | Denis et al. | |
| 3,908,904 A | 9/1975 | Kerner et al. | |
| 4,198,004 A | 4/1980 | Albus et al. | |
| 4,248,387 A | 2/1981 | Andrews | |
| 4,354,641 A | 10/1982 | Smith | |
| 4,504,017 A * | 3/1985 | Andrews ................ | B02C 19/06 241/152.1 |
| 4,515,093 A | 5/1985 | Beardmore et al. | |
| 4,671,192 A | 6/1987 | Hoffert et al. | |
| 4,919,853 A | 4/1990 | Alvarez et al. | |
| 4,921,173 A | 5/1990 | Bartley | |
| 5,219,530 A | 6/1993 | Hertzberg et al. | |
| 5,246,575 A | 9/1993 | Alexander | |
| 5,277,369 A | 1/1994 | Moriya et al. | |
| 5,306,330 A | 4/1994 | Nasikas | |
| 5,855,326 A | 1/1999 | Beliaysky | |
| 6,089,026 A | 7/2000 | Hu | |
| 6,145,765 A | 11/2000 | Capelle, Jr. et al. | |
| 6,152,158 A | 11/2000 | Hu | |
| 6,158,676 A | 12/2000 | Hughes | |
| 6,167,323 A | 12/2000 | Komino et al. | |
| 6,824,086 B1 | 11/2004 | Mazurkiewicz et al. | |
| 7,137,580 B2 | 11/2006 | Graham et al. | |
| 7,258,290 B2 * | 8/2007 | Taketomi .............. | B02C 19/063 241/40 |
| 7,398,934 B1 | 7/2008 | Capelle, Jr. | |
| 7,621,473 B2 | 11/2009 | Capelle, Jr. | |
| 7,789,331 B2 | 9/2010 | Zehavi et al. | |
| 7,850,105 B2 | 12/2010 | Ito et al. | |
| 8,172,163 B2 | 5/2012 | Soliman Abdalla et al. | |
| 8,398,007 B2 | 3/2013 | Ito et al. | |
| 8,448,518 B2 | 5/2013 | Kass et al. | |
| 8,480,859 B2 | 7/2013 | Kostrov et al. | |
| 8,726,532 B2 | 5/2014 | Hogan | |
| 9,050,604 B1 | 6/2015 | Lansell et al. | |
| 9,452,434 B1 * | 9/2016 | Lansell ................. | B02C 19/06 |
| 2004/0063874 A1 | 4/2004 | Muhle et al. | |
| 2004/0200910 A1 | 10/2004 | Graham et al. | |
| 2006/0144760 A1 | 7/2006 | Duyvesteyn et al. | |
| 2007/0267527 A1 | 11/2007 | Graham et al. | |
| 2008/0226535 A1 | 9/2008 | Park et al. | |
| 2009/0241816 A1 | 10/2009 | Taylor | |
| 2010/0025506 A1 | 2/2010 | Capelle, Jr. | |
| 2010/0101978 A1 | 4/2010 | Gordon et al. | |
| 2011/0206593 A1 | 8/2011 | Fahs, II et al. | |
| 2011/0283705 A1 | 11/2011 | Oliver | |
| 2011/0303013 A1 | 12/2011 | Kass | |
| 2012/0131901 A1 | 5/2012 | Westervelt et al. | |
| 2012/0230877 A1 | 9/2012 | Pinchot | |
| 2013/0221141 A1 | 8/2013 | Zhang et al. | |
| 2013/0224488 A1 | 8/2013 | Dos Santos Antunes et al. | |
| 2013/0309161 A1 | 11/2013 | Akay | |
| 2013/0315792 A1 | 11/2013 | O'Dowd | |
| 2013/0336845 A1 | 12/2013 | Chu | |
| 2014/0058095 A1 | 2/2014 | Rende et al. | |
| 2014/0058165 A1 | 2/2014 | Bedard et al. | |
| 2014/0058170 A1 | 2/2014 | Bedard et al. | |
| 2014/0058178 A1 | 2/2014 | Bedard et al. | |
| 2014/0110307 A1 | 4/2014 | Salazar-Gullen et al. | |
| 2014/0275687 A1 | 9/2014 | Beene et al. | |
| 2015/0165414 A1 | 6/2015 | Gattupalli et al. | |
| 2015/0352558 A1 | 12/2015 | Keating et al. | |
| 2015/0361010 A1 | 12/2015 | Leonard et al. | |
| 2016/0243488 A1 | 8/2016 | Wells et al. | |
| 2016/0296904 A1 | 10/2016 | Knowlen et al. | |
| 2017/0253492 A1 | 9/2017 | Beach et al. | |

FOREIGN PATENT DOCUMENTS

| | | |
|---|---|---|
| CN | 203620740 U | 6/2014 |
| DE | 102013019949 | 5/2015 |
| EA | 000004 | 9/1997 |
| FR | 1048667 | 12/1953 |
| GB | 1037770 | 8/1966 |
| JP | 2007-054799 A | 3/2007 |
| RU | 2 029 621 | 2/1995 |
| RU | 2520 U1 | 8/1996 |
| RU | 2 088 336 | 8/1997 |
| WO | WO 94/08719 | 4/1994 |
| WO | WO 97/33695 | 9/1997 |
| WO | 2006/067636 A2 | 6/2006 |
| WO | 2008/083138 | 7/2008 |
| WO | 2009/073447 A2 | 6/2009 |
| WO | 2014/210297 A1 | 12/2014 |
| WO | 2015/053857 A2 | 4/2015 |

OTHER PUBLICATIONS

Final Office Action dated Dec. 6, 2016 in corresponding U.S. Appl. No. 14/298,877 (10 pages).
Final Office Action dated Dec. 29, 2016 in corresponding U.S. Appl. No. 14/823,890 (14 pages).
Derwent abstract of DE 102013019949 A1.
M. Reader-Harris. Orifice Plates and Venturi Tubes, Chapter 3: Venturi Tube Design. 2015. pp. 77-96.
Demare, D., et al., "Acoustic enhancement of combustion in lifted non-remixed jet flames", The Combusion Institute, 139 (2004), 312-328, Elsevier, Inc.
Simpson, E., et al., Acoustic Performance of a Cylindrical Disk-Type Resonator, Journal of Sound and Vibration, (1978) 60(1), 151-156, Academic Press Inc. (London) Limited.
Narayanan, S., et al. "Acoustic characteristics of chamfered Hartmann whistles", Journal of Sound and Vibration, 330 (2011) 2470-2496, Elsevier, Ltd.
Narayanan, S. et al., Aero-acoustic features of internal and external chamfered Hartmann whistles: A comparative study, Journal of Sound and Vibration, 333 (2014) 774-787, Elsevier, Ltd.
International Preliminary Report on Patentability and the Written Opinion of the International Searching Authority as issued in International Patent Application No. PCT/US2015/034554, dated Sep. 3, 2015.
Hartmann, J. et al, "Synchronisation of Air-Jet Generators with an Appendix on the Stem Generator", Det Kgl. Danske Videnskabernes Selskab. Matematisk-fysiske Meddelelser, Bd. 26, No. 10, 1951(39 pages).
English machine translation for FR 1048667 A (Dec. 1953).
U.S. Non-Final Office Action dated Jul. 21, 2016 in corresponding U.S. Appl. No. 14/823,890 (13 pages).
International Preliminary Report on Patentability and the Written Opinion of the International Searching Authority as issued in International Patent Application No. PCT/US2015/034548, dated Sep. 8, 2015.

(56) References Cited

OTHER PUBLICATIONS

International Preliminary Report on Patentability PCT/US2016/046641 dated Feb. 13, 2018.
Non-final Office Action U.S. Appl. No. 14/823,890 dated Jan. 29, 2018.
Non-final Office Action U.S. Appl. No. 14/690,149 dated Jan. 25, 2018.
Final Office Action issued in corresponding U.S. Appl. No. 14/823,890 dated Sep. 4, 2018, 16 pages.
Final Office Action issued in corresponding U.S. Appl. No. 14/690,149 dated Sep. 4, 2018, 17 pages.
Office Action issued in corresponding Chinese Patent Application No. 201680035572.0 dated Jul. 24, 2018, 7 pages.
Notice of Allowance issued in corresponding U.S. Appl. No. 14/719,303 dated Jul. 25, 2018, 7 pages.
International Preliminary Report on Patentability PCT/US2016/028167 dated Oct. 17, 2017.
International Preliminary Report on Patentability PCT/US2016/028181 dated Oct. 17, 2017.
Extended European Search Report dated Dec. 13, 2018 in related European Patent Application No. 16781030.8, 10 pages.
Decision to Grant dated Jan. 15, 2019 in related Chinese Patent Application No. 201680035572.0, 4 pages.
Notice of Allowance dated Jan. 11, 2019 in related U.S. Appl. No. 14/690,149, 8 pages.
Notice of Allowance dated Jan. 11, 2019 in related U.S. Appl. No. 14/823,890, 8 pages.
Notice of Allowance dated Jun. 7, 2019 in related U.S. Appl. No. 14/823,890, 21 pages.
Notice of Allowance dated May 22, 2019 in related U.S. Appl. No. 14/690,149, 12 pages.
Notice of Grant dated Apr. 10, 2019 in related Kazakstani Patent Application No. 2017/1058.1, 14 pages.

\* cited by examiner

PROVIDING WEAR RESISTANCE IN A REACTOR CONFIGURED TO FACILITATE CHEMICAL REACTIONS AND/OR COMMINUTION OF SOLID FEED MATERIALS USING SHOCKWAVES CREATED IN A SUPERSONIC GASEOUS VORTEX

CROSS-REFERENCE TO RELATED APPLICATIONS

This application is a continuation of U.S. patent application Ser. No. 14/690,111, filed Mar. Apr. 17, 2015, entitled "Providing Wear Resistance In A Reactor Configured To Facilitate Chemical Reactions And/or Comminution Of Solid Feed Materials Using Shockwaves Created In A Supersonic Gaseous Vortex", the entirety of which is incorporated herein by reference.

FIELD OF THE DISCLOSURE

This disclosure relates to providing wear resistance in a reactor configured to facilitate chemical reactions, and/or comminution of solid feed materials using shockwaves created in a supersonic gaseous vortex.

BACKGROUND

Pulverization of solid feed material in a grinding chamber using a gas steam is known in the art. For example, jet mill is a type of grinding device that relies on high-speed gas streams to grind material inside the grinding chamber. Pulverization may take place in a central toroidal grinding chamber of the jet mill as the process material is driven around the perimeter of the chamber by multiple jets of air or steam. Size reduction via attrition may be a result of high-velocity collisions and resulting compressive forces between particles of the process material itself, and/or between particles of the processes material and interior walls of the grinding chamber of the conventional jet mill. The pulverization in a conventional jet mill may cause wear to the grinding chamber as the gas streams, carrying with pulverized particles impacts the grinding chamber.

It is known that wear in the conventional jet mill is responsible for limiting the size of the conventional jet mill. As the size (e.g., length, width, and/or radius) of the conventional jet mill increases, the volume of the process material that could pass through the jet mill may increase roughly by a magnitude corresponding to a cube of the size increase, and the surface of the grinding chamber may increase roughly by a magnitude corresponding to a square of the size increase. For example, if the size of the conventional jet mill is doubled, the volume of the process material that could pass through the jet mill may increase as much as by eight times and the wearable surface may only increase as much as by four times. The amount of wear in the conventional jet mill may be proportional to the amount of the process material and thus takes on the level of exponential increase of the process material. Accordingly, the exponential increase of potential wear may be much faster than the increase of wearable surface of the grinding chamber when the size of the conventional jet mill increases. This geometric wear limitation may limit scaling-up of the conventional jet mill. A conventional jet mill typically has an upper size limit of approximately one meter or about forty-two inches.

SUMMARY

One aspect of the disclosure relates to a reactor with a wear resistance design to reduce wear in the reactor in which materials are comminuted via tensive forces resulting from shockwaves induced within a chamber of the reactor. The reactor in accordance with the disclosure may be less constrained from being scaled up as compared to conventional air-flow pulverization devices such as a jet mill. The reactor may be configured to facilitate chemical reactions, and/or comminution of solid feed materials using shockwaves created in a supersonic gaseous vortex. The reactor may comprise a rigid chamber, a first gas inlet, a material inlet, and an outlet. The chamber may have a substantially circular cross-section centered on a longitudinal axis that is normal to the cross-section. The first gas inlet may be configured to introduce a high-velocity stream of gas into the chamber. The first gas inlet may be disposed and arranged so as to effectuate a vortex of the stream of gas circulating within the chamber. The vortex may rotate at a supersonic speed about the longitudinal axis of the chamber. The first gas inlet may be insulated from the body of the chamber. Various methods of generating a plasma within the gas flow may be employed to effectuate the rotation of the gas vortex, such as glow discharge, travelling wave, radio-frequency, microwave, and/or any other methods for converting gas into a plasma.

The material inlet may be configured to introduce a material to be processed into the chamber. The material inlet may be disposed proximal to the first gas inlet. The material may be processed within the chamber by nonabrasive mechanisms facilitated by shockwaves within the chamber. The outlet may be configured to emit the gas and processed material from the chamber. The outlet may be disposed at an opposite end of the chamber as the gas inlet and the material inlet.

The reactor may comprise a first replaceable wear part configured to protect a first portion of an inner surface of the chamber. The first portion of the inner surface of the chamber may be where the gas stream entrained by the first gas inlet, charged with pulverized particles of the process material, impacts the chamber. The first replaceable wear part may be disposed at the first portion of the inner surface of the chamber such that a first end of the first replaceable wear part may be adapted to absorb the impacts caused by the pulverized particles in the gas stream entrained by the first gas inlet. As used herein, such a first end of the first replaceable wear part is referred to as a contacting end of the first replaceable wear part. The first replaceable wear part may be made of one or more of tungsten carbide, titanium carbide, titanium nitride, diamond, diamond like carbon, silicon nitride, boron nitride, steel, iron, iron alloys, silicon carbide, partially stabilized zirconia (PSZ), fused alumina, boron nitride, carbides, nitrides, ceramics, silicates, geopolymers, metallic alloys, other alloys and/or any other material for wear resistance (or catalytic activity).

In some implementations, the first replaceable wear part may comprise a rotatable cylindrical rod that rotates as the pulverized particles impact the rod. The rotatable cylindrical rod may control the impact of the pulverized particles on the surface of the rod. In some implementations, the first replaceable wear part may be configured to continuously advance into the chamber as the surface of the contact end is worn.

In some implementations, the contacting end of the first replaceable wear part may be composed of or doped with a catalytic material. The catalyst material may ablate as the pulverized particles impact the contacting end of the first replaceable wear part. The catalyst material may be configured to enhance the chemical reactions and/or comminution that take place in the reactor. In some implementations, the first replaceable wear part may be electrically isolated from the rest of the reactor. This may facilitate an electrical field to be imparted on the first replaceable wear part. As such, the first replaceable wear part may enable the Non-Faradaic Electrochemical Modification of Catalytic Activity (NEMCA), also known as Electrochemical Promotion of Catalysis (EPOC), for reducing energy required for comminution, and/or the chemical reactions inside the chamber.

In some implementations, a second gas inlet corresponding to the first gas inlet may be employed. The second gas inlet may be configured to introduce a steering gas stream into reactor for controlling the direction(s) of the gas flow introduced by the first gas inlet. This "steering" effect by the second gas inlet may help control the impact area of the wear to be limited to a desired area, such as the first portion, of the inner surface of the chamber. The "steering" effect by the second gas inlet may be employed to introduce eddy current, and/or interference current to vary the shockwaves in the reactor. For achieving the "steering" effect, the second gas inlet may be disposed proximal to the first gas inlet.

In some implementations, the inner surface of the reactors may be configured to comprise pockets (e.g., disruptors). The pockets may be configured to have appropriate sizes so as to be pocked with the pulverized particles. This may create a layer of a "material wall" inside the reactor. The "material wall" may facilitate "material on material wear resistance". This approach is used in the comminution industry where it is known as a rock box. The material being processed forms a barrier to protect the machinery from wear.

In some implementations, multiple sets of a first gas inlet, a second gas inlet, and a replaceable wear part may be employed to enhance wear resistance of the reactor and as well as to increase the throughput of the reactor. The multiple sets of the gas inlets and replaceable wear parts may be disposed within the chamber of the reactor at various desired locations around the periphery of the chamber. This may reduce or control the wear caused by drag as the processed material travels in a long flight path before exiting. In some implementations, the shape of the chamber may be configured to have the continuously decreasing radius of the substantially circular cross-section is shaped as a cone, a hemisphere, or a horn-shape. This may advantageously limit the wear in the reactor in certain areas.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
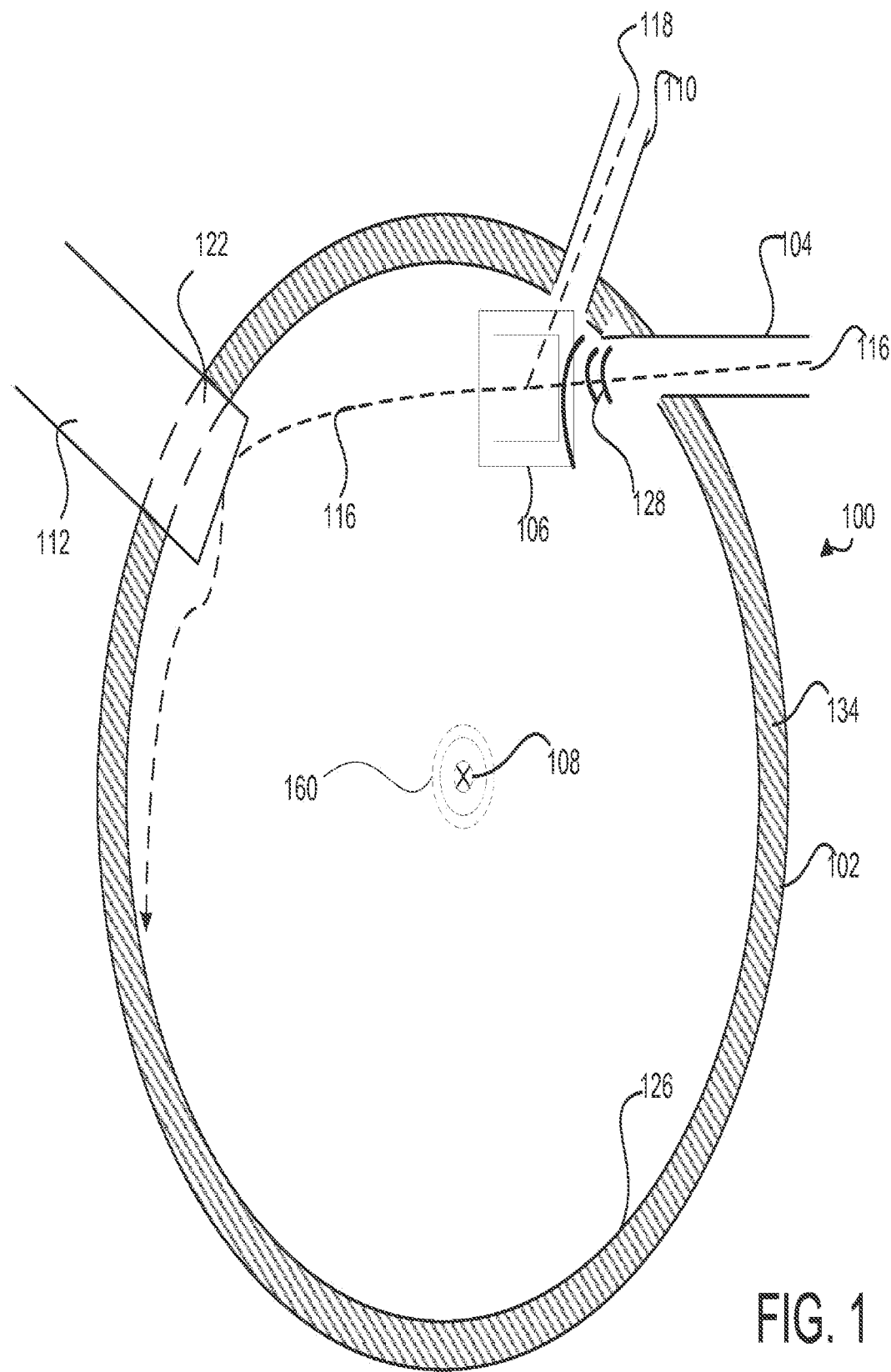
FIG. 1 illustrates a top view of a reactor, in accordance with one or more implementations.
Figure 2:
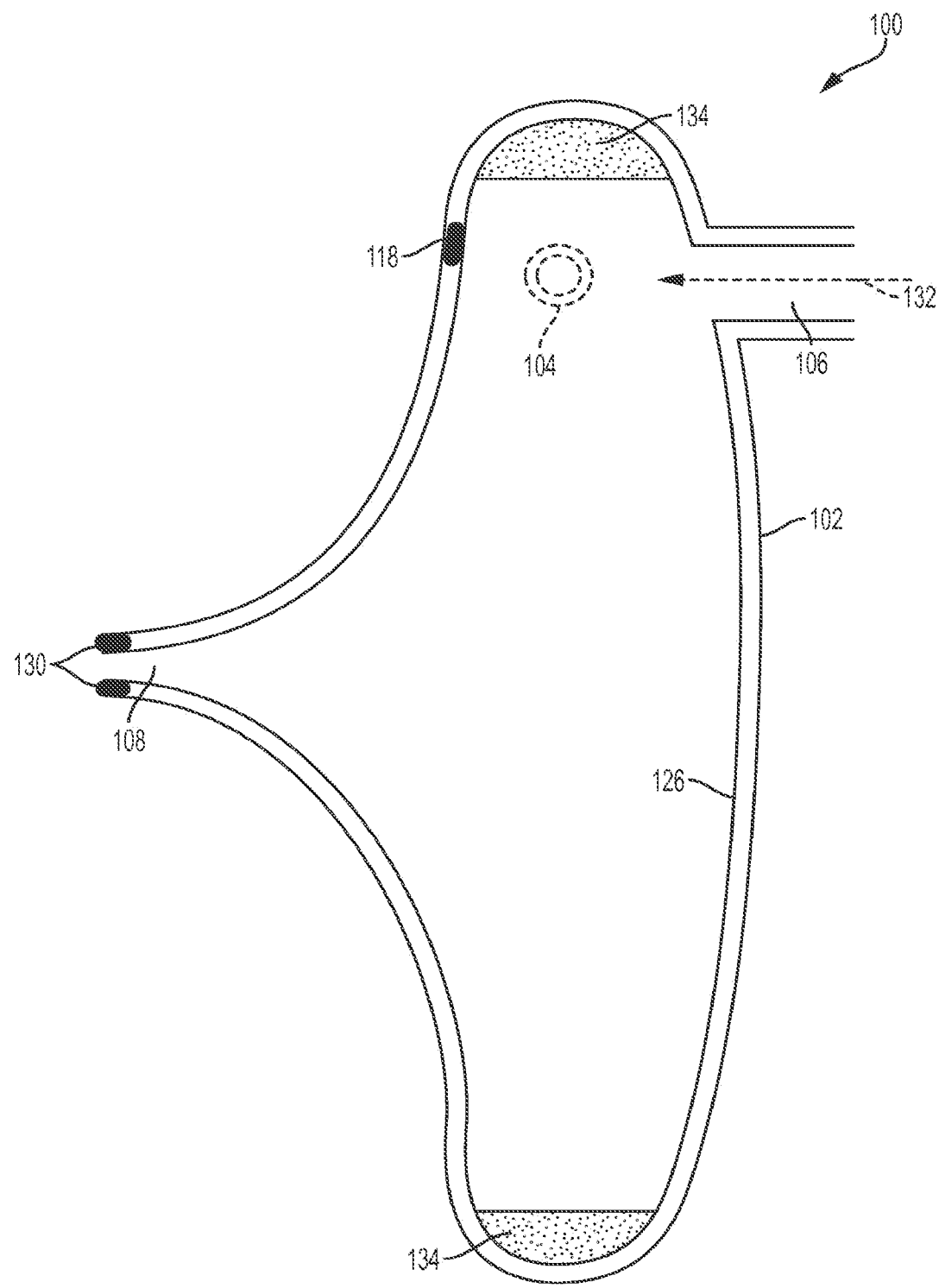
FIG. 2 illustrates a side view of the reactor, in accordance with one or more implementations.

FIGS. 1 and 2 illustrate a top and a side view of a reactor, respectively, in accordance with one or more implementations. With continuous reference to FIGS. 1 and 2, reactor 100 will be described. Reactor 100 may be configured to facilitate processing including chemical reactions, and/or comminution of solid feed materials using shockwaves created in a supersonic gaseous vortex. Such a reactor is described U.S. Non-provisional application Ser. No. 14/298,868 entitled "A Reactor Configured To Facilitate Chemical Reactions, and/or Comminution Of Solid Feed Materials Using Shockwaves Created In A Supersonic Gaseous Vortex", which is incorporated herein by reference. As shown, reactor 100 may include one or more of a chamber 102, a first gas inlet 104, a material inlet 106, an outlet 108, a second gas inlet 110, a first replaceable wear part 112, and/or other components.

Chamber 102 may be configured to provide a volume in which material processing occurs. Chamber 102 may have a substantially circular cross-section centered on a longitudinal axis 124 that is normal to the cross-section. The substantially circular cross-section may facilitate a vortex rotating within chamber 102. A radius of the substantially circular cross-section of chamber 102 may continuously decrease at an end of chamber 102 proximal to outlet 108. The continuous decrease of the radius of the substantially circular cross-section of chamber 102 may be configured to cause an acceleration of a rotational speed of the gaseous vortex. As the continuous decrease of the radius of the substantially circular cross-section of chamber 102 may be shaped as a cone (illustrated in FIG. 2), a hemisphere, a horn-shape, and/or other shapes.

Chamber 102 may be formed of various materials. Chamber 102 may be formed of a rigid material. Chamber 102 may be formed of a thermally conductive material. Chamber 102 may be formed of an electrically conductive material. According to some implementations, chamber 102 may be formed wholly or partially of steel, iron, iron alloys, silicon carbide, partially stabilized zirconia (PSZ), fused alumina, tungsten carbide, boron nitride, carbides, nitrides, ceramics, silicates, geopolymers, metallic alloys, other alloys, and/or other materials. In some implementations, an internal surface 116 of chamber 102 may be coated with one or more coatings. An exemplary coating may be configured to prevent physical or chemical wear to internal surface 116 of chamber 102. In some implementations, a coating or composition may be configured to promote a chemical reaction within chamber 102. An example of a coating or composition that may promote a chemical reaction may include one or more of iron; nickel; ruthenium; rhodium; platinum; palladium; cobalt; other transition metals and their alloys, compounds, and/or oxides (e.g., the lanthanide series and their compounds, alloys, and/or oxides); and/or other materials.

The first gas inlet 104 may be configured to introduce a high-velocity stream of gas into chamber 102. The first gas inlet 104 may be disposed and arranged so as to effectuate a vortex of the stream of gas circulating within chamber 102. The vortex may rotate about longitudinal axis of chamber 102. The gas inlet may be disposed so that the gas stream 116 is directed substantially perpendicular to longitudinal axis 124 of chamber 102. The first gas inlet 104 may be disposed so that the gas stream 116 is directed substantially tangent to a portion of the internal surface 126 of the substantially circular cross-section of chamber 102. The first gas inlet 104 may be disposed proximal to material inlet 106.

According to some implementations, the first gas inlet 104 may comprise inlet gas nozzle (not depicted in this example) disposed within the first gas inlet 104. In those implementations, the inlet nozzle may be configured to accelerate the stream of gas being introduced into chamber 102, to emit the stream of gas at a supersonic speed, to emit shockwaves in the stream of gas emitted from inlet nozzle, and/or for any other purposes. U.S. application Ser. No. 14/298,868 describes some exemplary implementations of the first gas inlet 104 in detail, incorporated supra.

The gas stream 116 introduced by the first gas inlet 104 may include any number of gaseous materials. In some implementations, the gas may include a reduced gas, i.e., a gas with a low oxidation number (or high reduction), which is often hydrogen-rich. The gas may include one or more of steam, methane, ethane, propane, butane, pentane, ammonia, hydrogen, carbon monoxide, carbon dioxide, oxygen, nitrogen, chlorine, fluorine, ethene, hydrogen sulphide, acetylene, and/or other gases. The gas may be a vapor. The gas may be superheated. In some implementations, the gas may be heated beyond a critical point, and/or compressed above a critical pressure so that the gas becomes a superheated gas, compressible fluid, and/or a super critical fluid.

The material inlet 106 may be configured to introduce material 132 (illustrated in FIG. 2) to be processed into chamber 102. As shown, the material inlet 106 may be disposed proximal to the first gas inlet 104. The material inlet 106 may be disposed on a flat surface of chamber 102 that is perpendicular to longitudinal axis 124 of chamber 102. The material inlet 106 may be disposed so that material 132 introduced into chamber 102 is directed parallel to longitudinal axis 124 of chamber 102. The material inlet 106 may be coupled to an auger (not depicted) that advances material through material inlet 106 into chamber 102.

Any number of material 132 may be processed by reactor 100. According to some implementations, the material to be processed may include a solid, a fluid, a liquid, a vapor, a gas, a plasma, a supercritical fluid, a mixture including one or more of the aforementioned materials, and/or other types of materials. By way of non-limiting example, material 132 to be processed within chamber 102 may include one or more of soil, coal, woodchips, food scraps, ore, and/or ore concentrate, mine tailings, tar sands, shale, an organic material, an inorganic material, and/or other materials.

Material 132 processed by reactor 100 may be processed by nonabrasive mechanisms facilitated by shockwaves 128 within chamber 102. For example, material 132 may be processed by tensile forces caused by shockwaves within chamber. Material 132 may be processed by cavitation in the stream of gas within chamber 102. As described below, material 132 may be processed in chamber 102 by direct impingement on the first replaceable part wear part 112. For example, material 132 may be fragmented by collision with the first replaceable part wear part 112. Material 132 may undergo a chemical transformation due to the catalytic effect built into the first replaceable part wear part 112, and/or due to the electric field imparted on the first replaceable part wear part 122.

The outlet 108 may be configured to emit the gas and processed material from chamber 102. The outlet 108 may be disposed at an end of chamber 102 opposite to the first gas inlet 104 and material inlet 106. The outlet may be disposed on longitudinal axis 124 of chamber 102. As particle size of the processed material is reduced, those particles may migrate toward outlet 108. The outlet 108 may be coupled to a vacuum chamber (not depicted) configured to trap processed material emitted from outlet 108.

In some implementations, outlet 108 may include one or more of an outlet nozzle 130 (illustrated in FIG. 2) disposed within outlet 108. The outlet nozzle 130 may be configured to pressurize chamber 102. The outlet nozzle 130 may be configured to effectuate a rapid cooling of processed material exiting chamber 102. According to some implementations, such rapid cooling may reduce or minimize back reactions of metals, and/or other chemicals susceptible to back reactions. In some implementations, the outlet nozzle 130 may include a venturi tube (not depicted).

For resisting wear in reactor 100, a first replaceable wear part 112 may be disposed at a first portion 122 of the inner surface 126 of chamber 102. The first portion 122 may be an area on the inner surface 126 where the stream 116, charged with pulverized particles from process material, contacts the surface 126. As such, the first portion 122 may be opposite to the first gas inlet 104 within chamber 102. The first replaceable wear part 112 may be disposed at the first portion 122 in a way to absorb impacts to first portion 122 on the inner surface 126 caused by the pulverized particles from the process material entrained by the gas stream 116 introduced by the first gas inlet 104. The first replaceable wear part 112 may be made of hard material such as tungsten carbide, titanium carbide, titanium nitride, diamond, polycrystalline diamond, diamond like carbon, silicon nitride, boron nitride, steel, iron, iron alloys, silicon carbide, partially stabilized zirconia (PSZ), fused alumina, boron nitride, carbides, nitrides, ceramics, silicates, geopolymers, metallic alloys, other alloys and/or any other materials for wear resistance. In some implementations, the first replaceable wear part 112 may be partially or wholly composed of one or more of iron; nickel; ruthenium; rhodium; platinum; palladium; cobalt; other transition metals and their alloys, compounds, and/or oxides (e.g., the lanthanide series and their compounds, alloys, and/or oxides); and/or other catalytic materials known to those skilled in the art and used to promote chemical reactions within the chamber 102.

Figure 3:
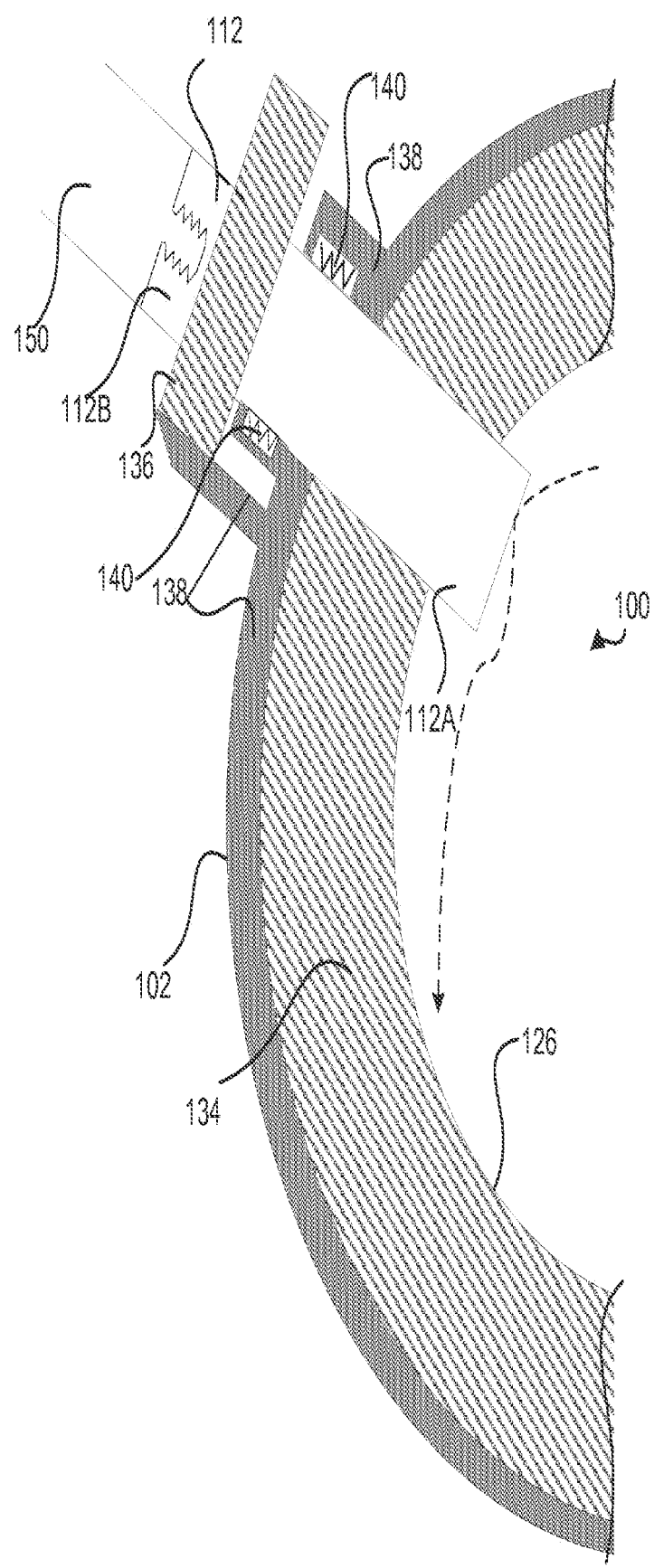
FIG. 3 illustrates one example of first replaceable wear part of the reactor shown in FIGS. 1 and 2 in a detailed view.

In some implementations, the first replaceable wear part 122 may be configured to continuously advance into the chamber as the surface of the contact end is worn. FIG. 3 illustrates one example of a first replaceable wear part 122 in a detailed view. It will be described with reference to FIGS. 1 and 2. As shown in this example, the first replaceable wear part 112 may comprise a first end 112A, e.g., the contacting end of the first replaceable wear part 112, and a second end 122B that is opposite to the first end 112A. As shown, the first replaceable wear part 112 may comprise a thruster 136 configured to continuously feed the first replaceable wear part 112 into chamber 102 as the surface of the first replaceable wear part 112 is worn by the impacts caused by the pulverized particles. As also shown in this example, casing 138 may be employed to be lined around chamber 102 and serve as a support to the first replaceable wear part 112. As still shown, around the casing 138 where the first replaceable wear part 112 enters chamber 102, seals 140 may be employed. Seals 140 may facilitate removal of the first replaceable wear part 112 for maintenance or replacement. The facilitated removal of first replaceable wear part 112 may reduce scheduled downtime as compared to the conventional jet mill. As shown, a second replaceable wear part 150 may be coupled to the first replaceable wear part 112 at the second end 112b of the first replaceable wear part 112. This may facilitate continuous feeding of replaceable wear parts into chamber 102.

In some implementations, the first replaceable wear part 112 may comprise a rotatable cylindrical rod adapted to control impacts of the pulverized particles. In those implementations, the cylindrical rod may rotate about the axis of its cylinder when the pulverized particles contact the rod. The rotation of the rod may allow the wear to be controlled on the surface of the rod.

In some implementations, the contacting end of the first replaceable wear part 112 may be coated with or composed of catalyst material. The catalyst material may be configured to protect the surface of the contacting end of the first replaceable wear part 112, and/or to promote a chemical reaction within chamber 102. For example, the catalyst material may be incorporated into the matrix of the first replaceable wear part 112 during manufacturing of the first replaceable wear part 112. A number of factors may contribute to including catalyst material in the first wear part. For example, in situations where the reaction in the chamber 102 involves mostly comminution, very little or none of catalyst material may be added to the first replaceable wear part 112. In situations where it is desired to have catalytic activity in the chamber 102, the rate at which catalyst material added to the first replaceable wear part 112 would ablate due to wear, how much of poisoning of the catalyst is needed in the chamber 102, and/or any other consideration may be taken into account. Accordingly, the catalyst material that may be coated on the contacting end, or embedded in the matrix, of the first replaceable wear part 112 may include one or more of platinum, palladium, iron; nickel; ruthenium; rhodium; platinum; palladium; cobalt; other transition metals and their alloys, compounds, and/or oxides (e.g., the lanthanide series and their compounds, alloys, and/or oxides); and/or any other catalyst material for aiding the chemical reaction(s), and/or the comminution inside chamber 102. The coating on, or composition of, the first replaceable wear part 112 may be configured such that the coated catalyst material ablates from the surface of the first replaceable wear part 112 at a rate that exposes a new clean surface of the first replaceable wear part 112. The ablated catalyst material may increase the throughput, and/or activity in chamber 102 by increasing the rate of reactions without a need to physically scale the size of reactor 100.

In some implementations, the first replaceable wear part 112 may be configured to be electrically isolated from chamber 102, and/or other components of reactor 100. This may facilitate an electrical field on the first replaceable wear part 112 having a variable voltage, amperage, frequency, waveform, and/or any other type(s) electrical potential to aid chemical reaction in chamber 102. In those implementations, the first replaceable wear part 112 may enable the Non-Faradaic Electrochemical Modification of Catalytic Activity (NEMCA), also known as Electrochemical Promotion of Catalysis (EPOC), for reducing energy required for comminution, and/or the chemical reactions inside chamber 102.

Returning to FIGS. 1 and 2, in some implementations, reactor 100 may comprise a second gas inlet 110 for controlling the direction of the gas stream 116. As shown, the second gas inlet 110 may be arranged proximal to the first gas inlet 104. The second gas inlet 110 may comprise a nozzle configured to introduce a gas stream 118 to produce a "steering effect" to the gas stream 116. That is, the gas stream 118 may be introduced to control the direction of the first gas stream 116 such that the first gas stream 116 may be directed to a particular direction to even out wear in chamber 102. To achieve this, the second gas inlet 110 may be disposed such that the gas stream 118 may have an axial flow configured to intercept the gas stream 116 introduced by the first gas inlet 104. As illustrated, the second gas inlet 110 may be employed to "steer" the gas stream 116 towards a desired area on the inner surface 126 of chamber 102. For example, without limitation, the second gas inlet 110 may be employed to steer the gas stream towards the first replaceable wear part 112 for limiting wear impact to the first replaceable wear part 112. In another example, the second gas inlet 118 may be disposed such that the gas stream 116 is directed to a second portion of the inner surface 126 of reactor 100 to even out wear inside chamber 102. In some implementations, gas stream 118 may be configured to introduce eddy current and interference currents into chamber 102 to vary the shock wave effects of reactor 100. In another example, the second gas stream may be composed of a different gas to the first gas stream and may be designed to affect a chemical reaction. For instance, the first gas stream may be composed of hydrogen, and the second gas stream may be composed of nitrogen. With a suitable catalyst included in the composition of the first replaceable wear part 112, ammonia may be produced at certain temperatures and pressures.

In some implementations, inner surface 126 of chamber 102 may comprise pockets (e.g., disruptors) around the periphery of the chamber 126. The pockets may be configured with appropriate sizes to receive some or all of the process material such that it is packed into the inner surface 126. FIG. 2 illustrates such pockets 134 on the inner surface 126 of chamber 102. The process material that is packed by the pockets may form a layer on the inner surface 126 to effect "material on material" wear resistance. That is, the process material packed into the pockets on the inner surface 126 may form a "new surface" of chamber 102 with the same hardness as the process material impacting the chamber 102.

Figure 4:
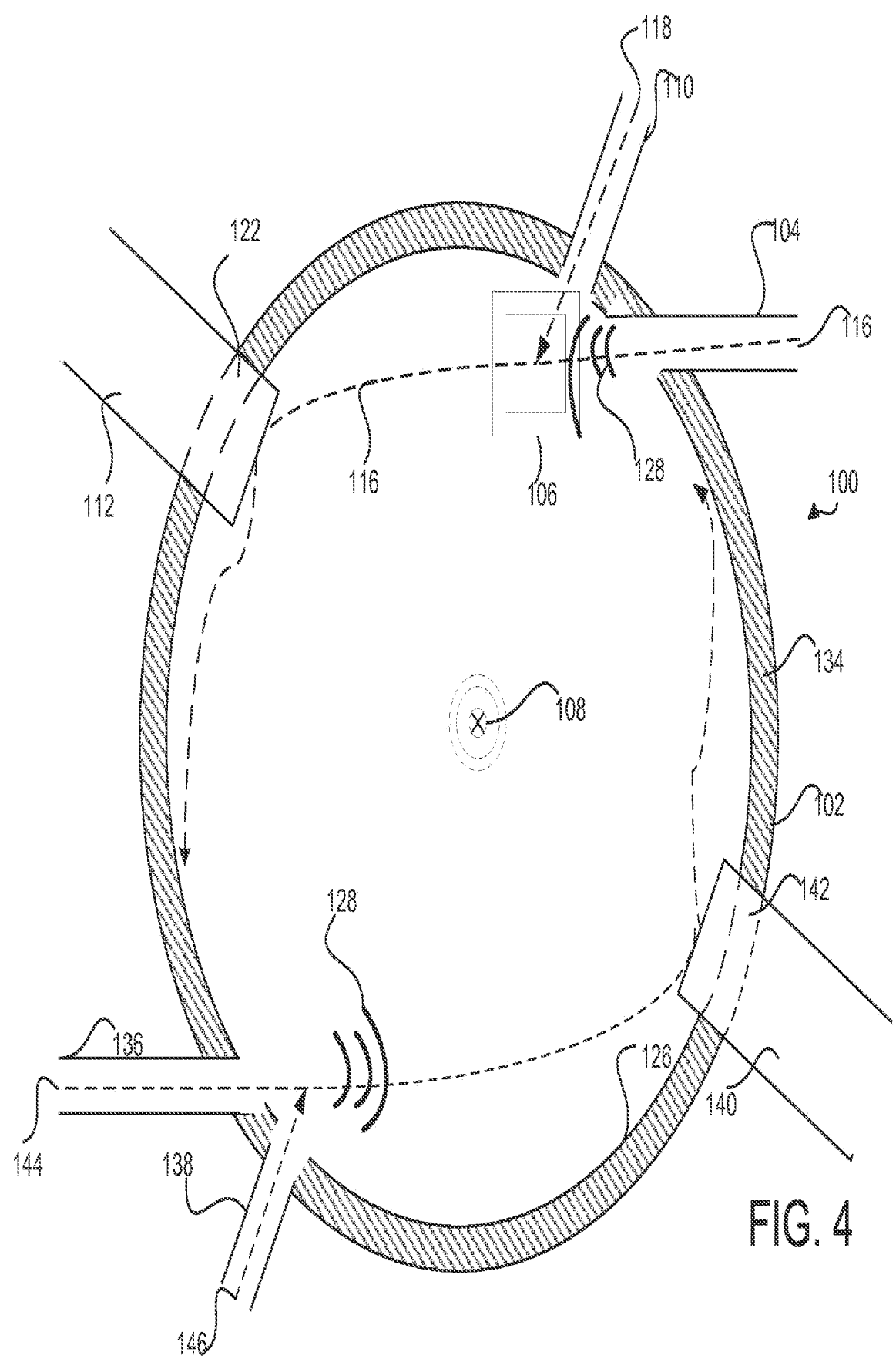
FIG. 4 illustrates one example of including multiple gas inlets and replaceable wear parts in the reactor shown in FIGS. 1 and 2.

In some implementations, additional gas inlets and replaceable wear part may be included in reactor 100 to reduce and control effects caused by drag or boundary layers in reactor 100 as process material is required to travel a long flight path before existing. FIG. 4 illustrates one example of including multiple gas inlets and replaceable wear parts in reactor 100. It will be described with reference to FIGS. 1-2. As shown, in addition to the first gas inlet 104, the second gas inlet 110 and the first replaceable wear part 112, reactor 100 may further comprise a third gas inlet 144, a fourth gas inlet 146, and a second replaceable wear part 142 arranged similarly to the arrangement of the first gas inlet 104, the second gas inlet 110 and the first replaceable wear part 112. That is, the fourth gas inlet 138 may be disposed proximal to the third gas inlet 144 such that gas stream 146 introduced by the fourth gas inlet 128 may "steer" the supersonic gas stream 144 introduced by the third gas inlet 144. As shown, the second replaceable wear part 140 may be disposed at a second portion 142 of inner surface 126 of chamber 102. The second portion 142 may be an area of inner surface 126 where gas stream 144, charged with pulverized particles from the process material, impacts the inner surface 126.

Figure 5:
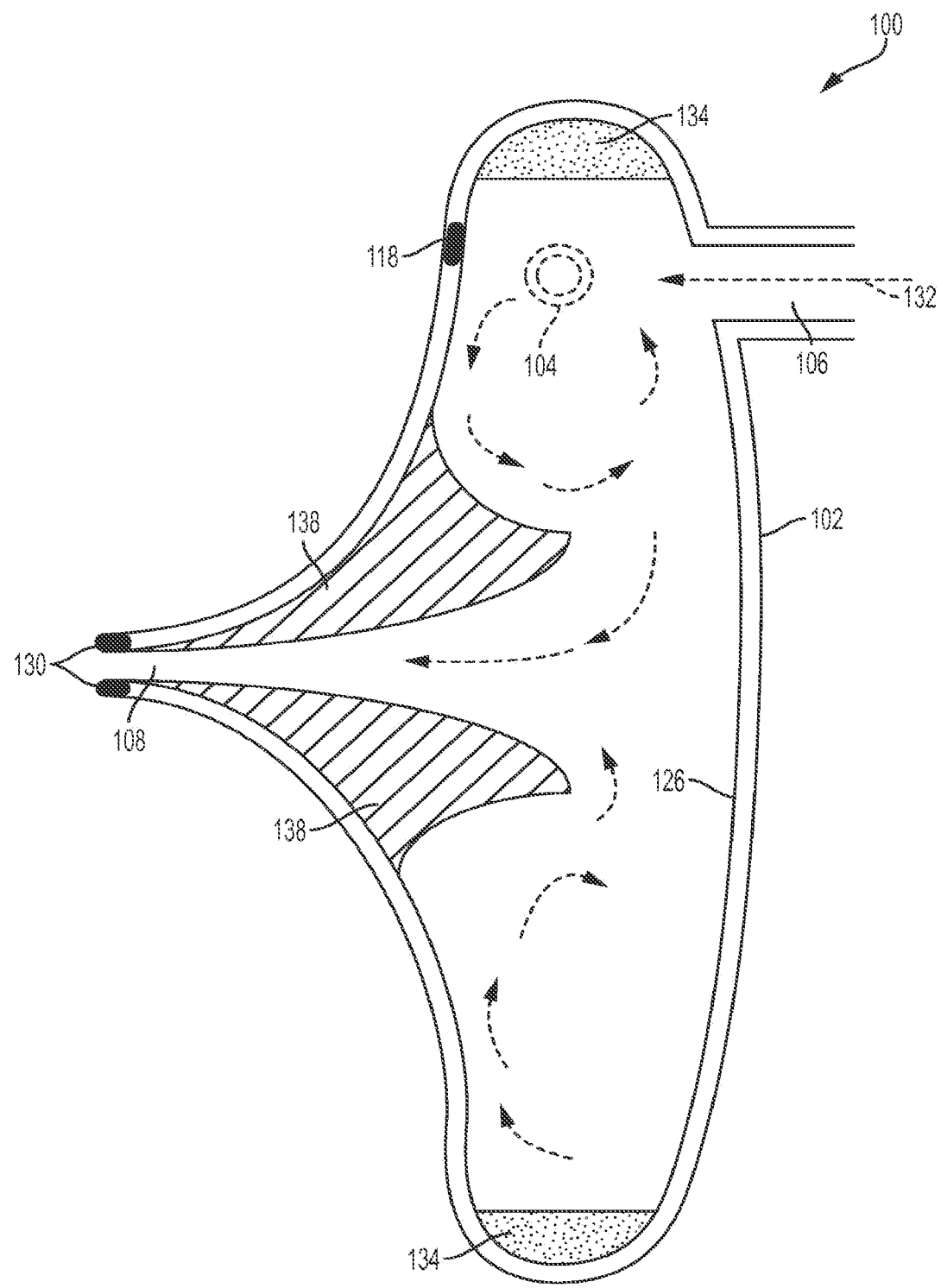
FIG. 5 illustrates one example of a shape of the interior volume of chamber designed to control the wear impact.

Returning to FIGS. 1 and 2, in some implementations, the shape of the interior volume of chamber 102 may be configured to control wear impact to be on desired areas within chamber 102. FIG. 5 illustrates one example of a shape of the interior volume of chamber 102 designed to control the wear impact. It will be described with reference to FIGS. 1 and 2. As shown in this example, reactor 100 may comprise casings 138 that may "partition" chamber 102 into multiple sections. In this example, the casings 138 "partitions" chamber 102 into sub-chambers in which majority of the gaseous vortex takes place as illustrated. In this way, the wear impact during the pulverization process may be controlled to be controlled in desired areas within chamber 102.

Other components that may be included in reactor 100 may include, a heating component configured to provide heat to chamber 102, a ventilation component 122 configured to vent gas from a region surrounding chamber 102, one or more sensors configured to provide a signal conveying information related to one or more parameters associated with reactor 100, and/or any other components. U.S. application Ser. No. 14/298,868, incorporated supra, describes some exemplary implementations of these components in reactor 100 in detail.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A reactor configured to facilitate chemical reactions, and/or comminution therein using shockwaves created in a supersonic gaseous vortex, the reactor being further configured to resist wear caused by the chemical reactions, and/or comminution, the reactor comprising:
   a rigid chamber having a substantially circular cross-section centered on a longitudinal axis that is normal to the cross-section;
   a first gas inlet configured to introduce a high-velocity stream of gas into the chamber, the first gas inlet being disposed and arranged so that the high-velocity stream of gas is directed substantially tangent to an internal surface of the rigid chamber, and so as to effectuate a vortex of the stream of gas circulating within the chamber, the vortex rotating at a supersonic speed about the longitudinal axis of the chamber;
   a material inlet configured to introduce a material to be processed into the chamber, the material inlet being disposed proximal to the first gas inlet and configured to introduce the material to be processed perpendicular to the high-velocity stream of gas, the material being processed within the chamber by nonabrasive mechanisms facilitated by shockwaves within the chamber;
   an outlet configured to emit the gas and processed material from the chamber; and
   a first replaceable wear part configured to protect an inner surface of the chamber, the first replaceable wear part corresponding to the first gas inlet such that the first replaceable wear part is disposed at a first portion of the inner surface of the chamber, wherein a first end of the first wear part is configured to contact processed material particles at the first portion of the inner surface of the chamber, wherein
   processing of the material within the chamber causes a wear impact to the first portion of the inner surface of the chamber due to the stream of gas introduced by the first gas inlet.

2. The reactor of claim 1, wherein the first replaceable wear part is made of tungsten carbide, titanium carbide, or titanium nitride, and/or diamond.

3. The reactor of claim 1, wherein the first wear part includes a cylindrical rod configured to rotate about a longitudinal axis of the cylindrical rod, the rod being disposed such that a first end of the rod forms a portion of or the entire first end of the wear part.

4. The reactor of claim 3, wherein the surface of the first end of the rod is coated with catalytic material to enhance a throughput of the reactor.

5. The reactor of claim 4, wherein the catalytic material includes platinum, and/or palladium.

6. The reactor of claim 3, wherein the first replaceable wear part is electronically isolated from the rest of the reactor.

7. The reactor of claim 1, wherein the first replaceable wear part is further configured such that the first replaceable wear part is continuously fed into the chamber.

8. The reactor of claim 1, wherein the first replaceable wear part is further configured such that another replaceable wear part can be coupled to a second end of the first replaceable wear part for continuous feed into the chamber, the second end being opposite of the first end of the first replaceable wear part.

9. The reactor of claim 1, wherein the first portion of the inner surface of the chamber is located opposite to the first gas inlet within the chamber.

10. The reactor of claim 1, further comprising a second gas inlet configured to introduce a gas flow into the chamber, the second gas inlet being disposed proximal to the first gas inlet such that the gas flow introduced by the second gas inlet alters the direction of the gas flow introduced by the first gas inlet.

11. The reactor of claim 10, wherein the second gas inlet is disposed such that the gas flow introduced by the second gas inlet introduces eddy current, and/or interface current to vary the shockwaves within the chamber.

12. The reactor of claim 1, wherein the chamber is configured such that the inner surface of the chamber comprises pockets adapted to pack processed material particles into the inner surface of the chamber.

13. The reactor of claim 1, wherein the first gas inlet includes an inlet nozzle disposed within the first gas inlet, the inlet nozzle being configured to emit the stream of gas at a supersonic speed.

14. The reactor of claim 11, wherein the inlet nozzle is configured to emit shockwaves in the stream of gas emitted from the inlet nozzle.

15. The reactor of claim 1, wherein a portion of the chamber, having a continuously decreasing radius of the substantially circular cross-section, is shaped as a cone, a hemisphere, or a horn-shape.

16. The reactor of claim 1, further comprising:
   a third gas inlet configured introduce a high-velocity stream of gas into the chamber, the third gas inlet being disposed and arranged so as to effectuate a vortex of the stream of gas circulating within the chamber, the vortex rotating at a supersonic speed about the longitudinal axis of the chamber;

a fourth gas inlet configured to introduce a gas flow into the chamber, the fourth gas inlet being disposed proximal to the third gas inlet such that the gas flow introduced by the fourth gas inlet alters the direction of the gas flow introduced by the third gas inlet;

a second replaceable wear part configured to protect the inner surface of the chamber, the second replaceable wear part corresponding to the third gas inlet such that the second replaceable wear part is disposed at a second portion of the inner surface of the chamber, wherein first end of the second wear part is adapted to contact processed material particles at the second portion of the inner surface of the chamber; and, wherein processing of the material within the chamber causes a wear impact to the second portion of the inner surface of the chamber due to the stream of gas introduced by the third gas inlet.

17. The reactor of claim 1, wherein the reactor has at least a throughput value of 50 tons per hour.

* * * * *